United States Patent
Padmanabhan et al.

(10) Patent No.: US 11,640,398 B2
(45) Date of Patent: May 2, 2023

(54) METHOD AND SYSTEM FOR DATA COMMUNICATION WITH RELATIONAL DATABASE MANAGEMENT

(71) Applicant: Bank of America Corporation, Charlotte, NC (US)

(72) Inventors: Srikanth Padmanabhan, Tamil Nadu (IN); Chellaiyan Ramalingam, Tamil Nadu (IN)

(73) Assignee: Bank of America Corporation, Charlotte, NC (US)

(*) Notice: Subject to any disclaimer, the term of this patent is extended or adjusted under 35 U.S.C. 154(b) by 508 days.

(21) Appl. No.: 16/542,695

(22) Filed: Aug. 16, 2019

(65) Prior Publication Data

US 2021/0049174 A1    Feb. 18, 2021

(51) Int. Cl.
```
G06F 16/245    (2019.01)
G06F 16/2453   (2019.01)
G06F 16/22     (2019.01)
G06F 11/34     (2006.01)
G06N 20/00     (2019.01)
G06F 16/21     (2019.01)
G06F 40/205    (2020.01)
```

(52) U.S. Cl.
CPC .... G06F 16/24545 (2019.01); G06F 11/3428 (2013.01); G06F 16/217 (2019.01); G06F 16/2282 (2019.01); G06F 40/205 (2020.01); G06N 20/00 (2019.01)

(58) Field of Classification Search
CPC ............. G06F 16/24545; G06F 16/217; G06F 16/2282; G06F 40/205; G06F 11/3428; G06N 20/00

USPC ........................................................ 707/713
See application file for complete search history.

(56) References Cited

U.S. PATENT DOCUMENTS

| | | | |
|---|---|---|---|
| 7,739,269 B2 | 6/2010 | Chaudhuri et al. | |
| 7,958,113 B2 | 6/2011 | Fan et al. | |
| 8,332,388 B2 | 12/2012 | Chaudhuri et al. | |
| 9,009,140 B2 | 4/2015 | Chen et al. | |
| 9,633,075 B2 | 4/2017 | Song et al. | |
| 10,152,510 B2 | 12/2018 | Baranczyk et al. | |
| 10,223,417 B1 | 3/2019 | Sirin et al. | |
| 10,303,683 B2 | 5/2019 | Anderson et al. | |
| 2008/0195577 A1* | 8/2008 | Fan | G06F 16/24545 |
| 2009/0100004 A1* | 4/2009 | Andrei | G06F 16/2453 |
| 2017/0083569 A1* | 3/2017 | Boguraev | G06F 16/24522 |
| 2018/0089268 A1* | 3/2018 | Lee | G06F 16/254 |
| 2018/0278500 A1* | 9/2018 | Feamster | H04L 63/1425 |
| 2018/0349364 A1* | 12/2018 | Arnold | G06F 16/901 |

(Continued)

*Primary Examiner* — Hosain T Alam
*Assistant Examiner* — Robert F May
(74) *Attorney, Agent, or Firm* — Banner & Witcoff, Ltd.

(57) ABSTRACT

Methods, systems, and computing platforms for data communication are disclosed. The processor(s) may be configured to electronically receive a SQL query request for a relational computer readable database having plurality of computer readable records. The processor(s) may be configured to electronically process the SQL query request with a machine learning controller based on a set of machine learning training data so as to output at least one probable smart execution plan for executing the SQL query request. The processor(s) may be configured to electronically output the at least one probable smart execution plan for executing the SQL query request to a relational database management processing module.

20 Claims, 8 Drawing Sheets

(56) References Cited

U.S. PATENT DOCUMENTS

2020/0210387 A1* 7/2020 Brown .................... G06N 5/04
2020/0334233 A1* 10/2020 Lee ......................... G06N 3/08
2020/0409948 A1* 12/2020 Corvinelli ............ G06N 3/0472

* cited by examiner

METHOD AND SYSTEM FOR DATA COMMUNICATION WITH RELATIONAL DATABASE MANAGEMENT

FIELD OF THE DISCLOSURE

The present disclosure relates to methods, systems, and computing platforms for data communication with relational database management and machine learning.

BACKGROUND

Moore's law predicted that the number of transistors on a computer chip would double every two years while the chip's price would remain constant. "Moore's law" meant consumers could buy better technology two years later for about the same price. Fifty years later, Moore's law prediction has endured to the idea that technology companies have recognized Moore's law as a benchmark they must meet, or fall behind in the market. Patrons have come to expect technological products to be faster, cheaper, and more compact over time. This expectation seems to have driven trends of rapid growth in computing power, smaller devices, the ability to connect to the Internet, and reduction in cost and big data.

A database typically includes one or more database tables for storing data values. To retrieve and manipulate the data in the database, a user, application program or a remote system typically issues a database query to a Database Management System (DBMS).

The database query is compiled before execution. During compilation, the relational operators may be ordered in a "query plan" or "access plan." Database users and administrators sometimes need to manually examine and tune the query plans to achieve better performance.

In addition, manual performance tuning can be extremely time-consuming and difficult. Complex Structured Query Language (SQL) queries may require different tuning methods to be performed. In the likely event of a data volume change, the entire tedious tuning process will have to be repeated to evaluate the change in performance. Moreover, different databases have different properties, and the programmer has to be familiar with the specific properties of the underlying database in order to perform the performance tuning.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

One aspect of the present disclosure relates to a system configured for mobile data communication. The system may include one or more hardware processors configured by machine-readable instructions. The processor(s) may be configured to electronically receive a query request (such as, a SQL query request) for a relational computer readable database having plurality of computer readable records. The processor(s) may be configured to electronically process the SQL query request with a machine learning controller based on a set of machine learning training data so as to output at least one probable smart execution plan for executing the SQL query request. The processor(s) may be configured to electronically output the at least one probable smart execution plan for executing the SQL query request to a relational database management processing module.

In some implementations of the system and method, the processor(s) may be configured to process the data with a deep machine learning controller. In some implementations of the system and method, the processor(s) may be configured to parse the SQL query request. In some implementations of the system and method, the processor(s) may be configured to process the machine learning training data including at least one cost profile attribute data element. In some implementations of the system and method, the processor(s) may be configured to process the machine learning training data including at least one optimizer rules attribute data element.

In some implementations of the system and method, the processor(s) may be configured to process a baseline execution plan for the SQL query request. In some implementations of the system and method, the processor(s) may be configured to compare the baseline execution plan to the least one probable smart execution plan, if an estimated cost of the least one probable smart execution plan is less than an estimated cost of the baseline execution plan, electronically re-write the SQL query request.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
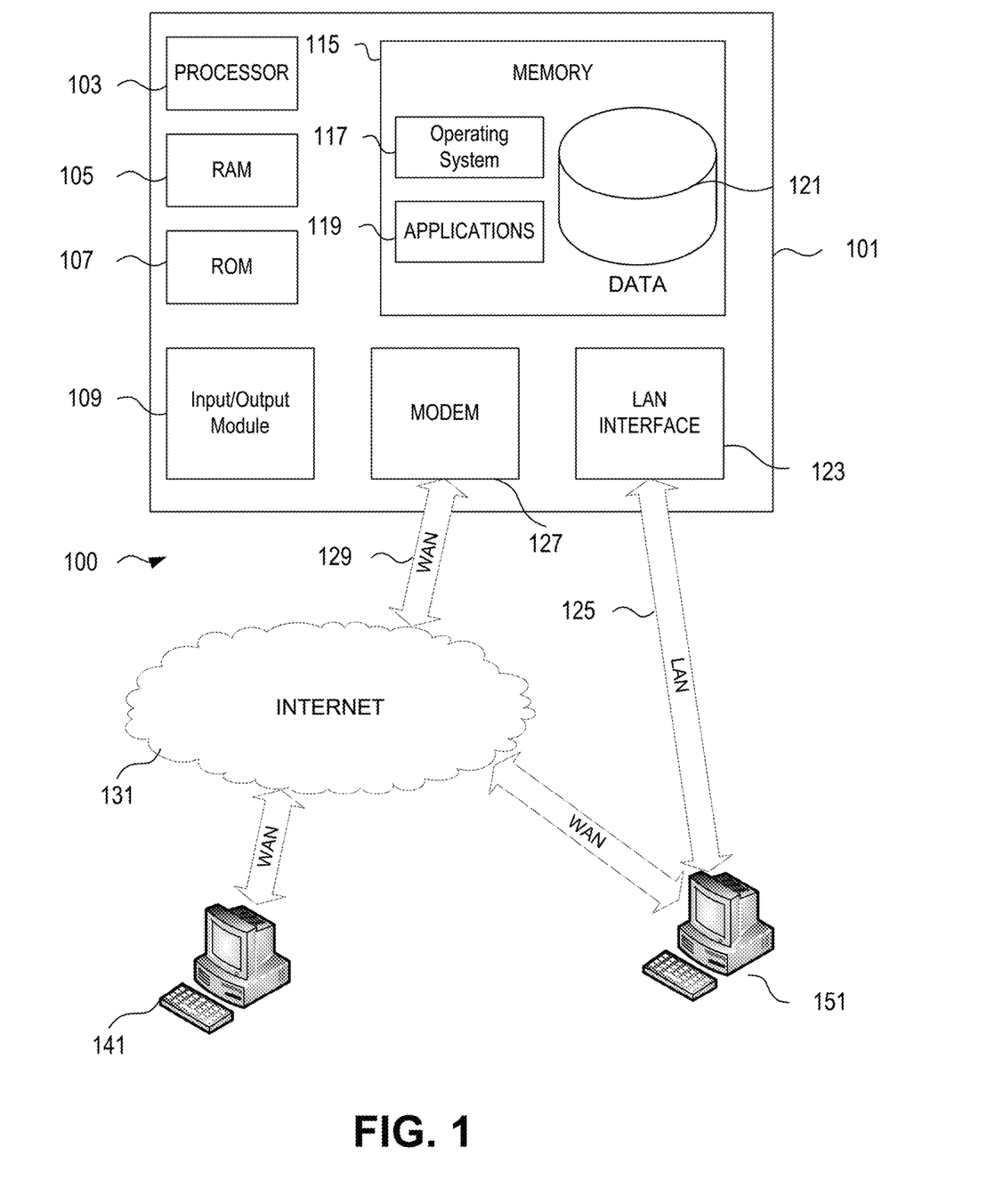
FIG. 1 illustrates a schematic diagram of a digital computing environment in which certain aspects of the present disclosure may be implemented.

FIG. 1 illustrates a block diagram of a specific programmed computing device 101 (e.g., a computer server) that may be used according to an illustrative embodiment 100 of the disclosure. The computer server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide computer readable instructions to processor 103 for enabling server 101 to perform various technologic functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with vendors and patrons, allowing functional interoperability between different elements located at multiple physical locations and may use ORACLE, TERADATA, NETEZZA software.

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various protocols such as TCP/IP, Ethernet, FTP, HTTP and the like is presumed.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of computing systems, environments, and/or configurations that may be suitable for use with the disclosure include, but are not limited to, personal computers, server computers, handheld or laptop devices, multiprocessor systems, microprocessor-based systems, set top boxes, programmable consumer electronics, network PCs, minicomputers, mainframe computers, mobile computing devices, e.g., smart phones, wearable computing devices, tablets, distributed computing environments that include any of the above systems or devices, and the like.

The disclosure may be described in the context of computer-executable instructions, such as program modules, being executed by a computer. Generally, program modules include routines, programs, objects, components, data structures, etc. that perform particular tasks or implement particular computer data types. The disclosure may also be practiced in distributed computing environments where tasks are performed by remote processing devices that are linked through a communications network. In a distributed computing environment, program modules may be located in both local and remote computer storage media including memory storage devices.

Figure 2:
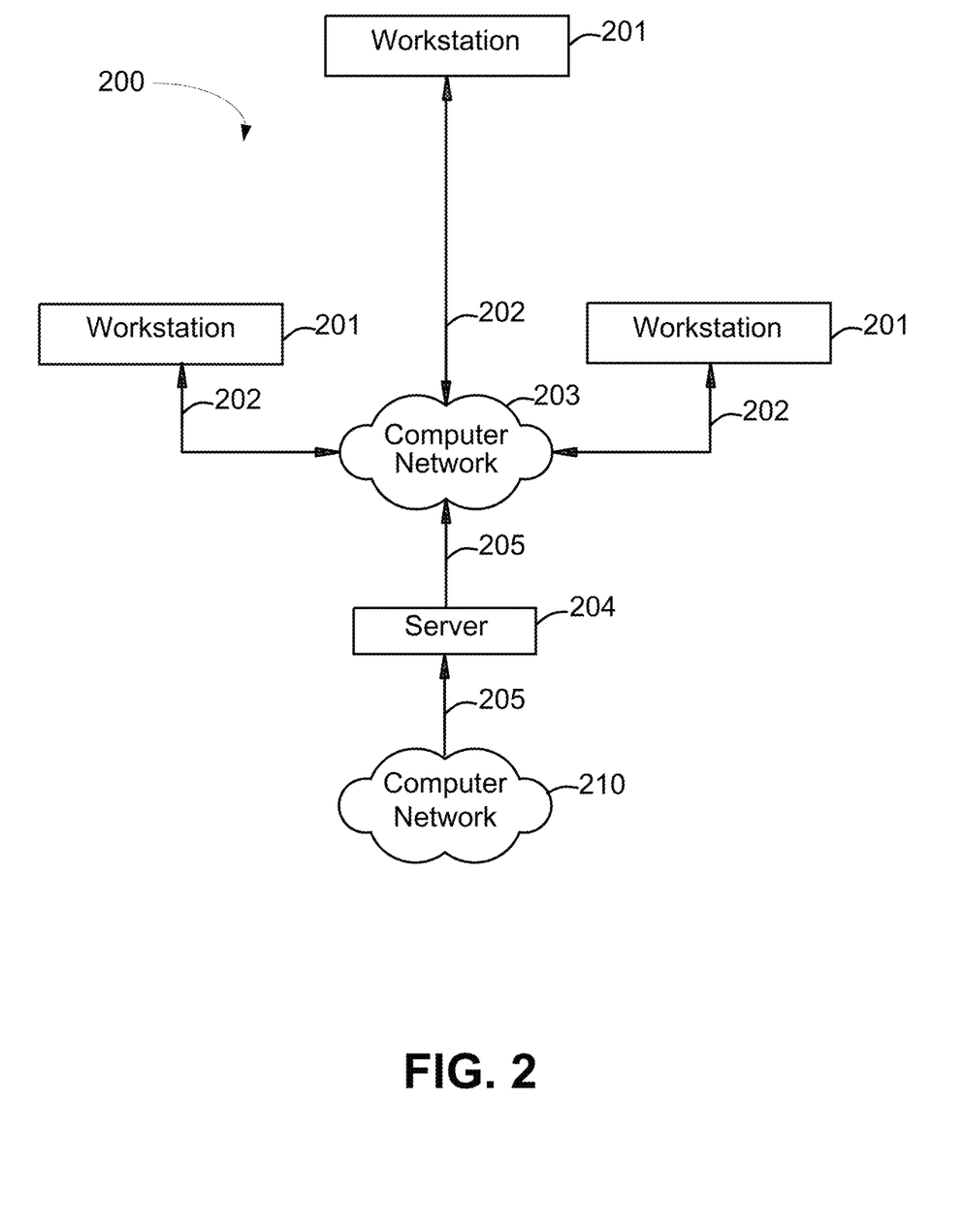
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer networks 203, 210 that is linked via communications links 205 to server 204. In system 200, server 204 may be any suitable server, processor, computer, or data processing device, or combination of the same. Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

Figure 3:
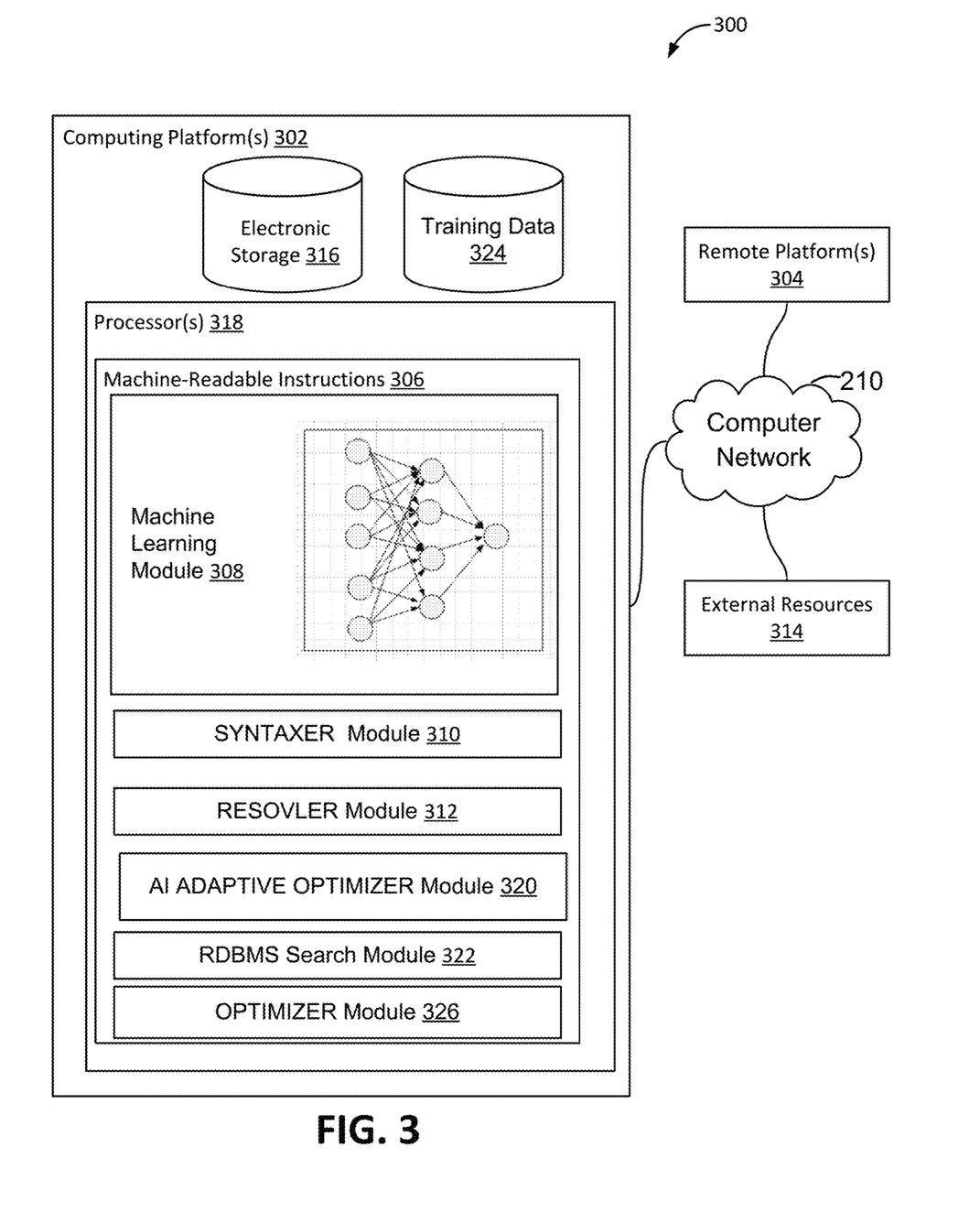
FIG. 3 illustrates a system configured for data communication, in accordance with one or more implementations.

FIG. 3 illustrates a system 300 configured for data communication, in accordance with one or more implementations. In some implementations, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304.

Computing platform(s) 302 may be configured by machine-readable instructions 306. Machine-readable instructions 306 may include one or more instruction modules. The instruction modules may include computer program modules. The instruction modules may include one or more of machine learning module 308, syntaxer module 310, resolver module 312, AI enhanced adaptive optimizer module 320, RDBMS module 322, optimizer module 326 and/or other instruction modules.

The modules 308, 310, 312, 320, 322, 326 and other modules implement APIs containing functions/sub-routines which can be executed by another software system, such as email and internet access controls. API denotes an Application Programming Interface. The systems and methods of the present disclosure can be implemented in various technological computing environments including Simple Object Access Protocol (SOAP) or in the Representational State Transfer (REST). REST is the software architectural style of the World Wide Web. REST APIs are networked APIs that can be published to allow diverse clients, such as mobile applications, to integrate with the organizations software services and content. Many commonly-used applications work using REST APIs as understood by a person of skill in the art.

Figure 5:
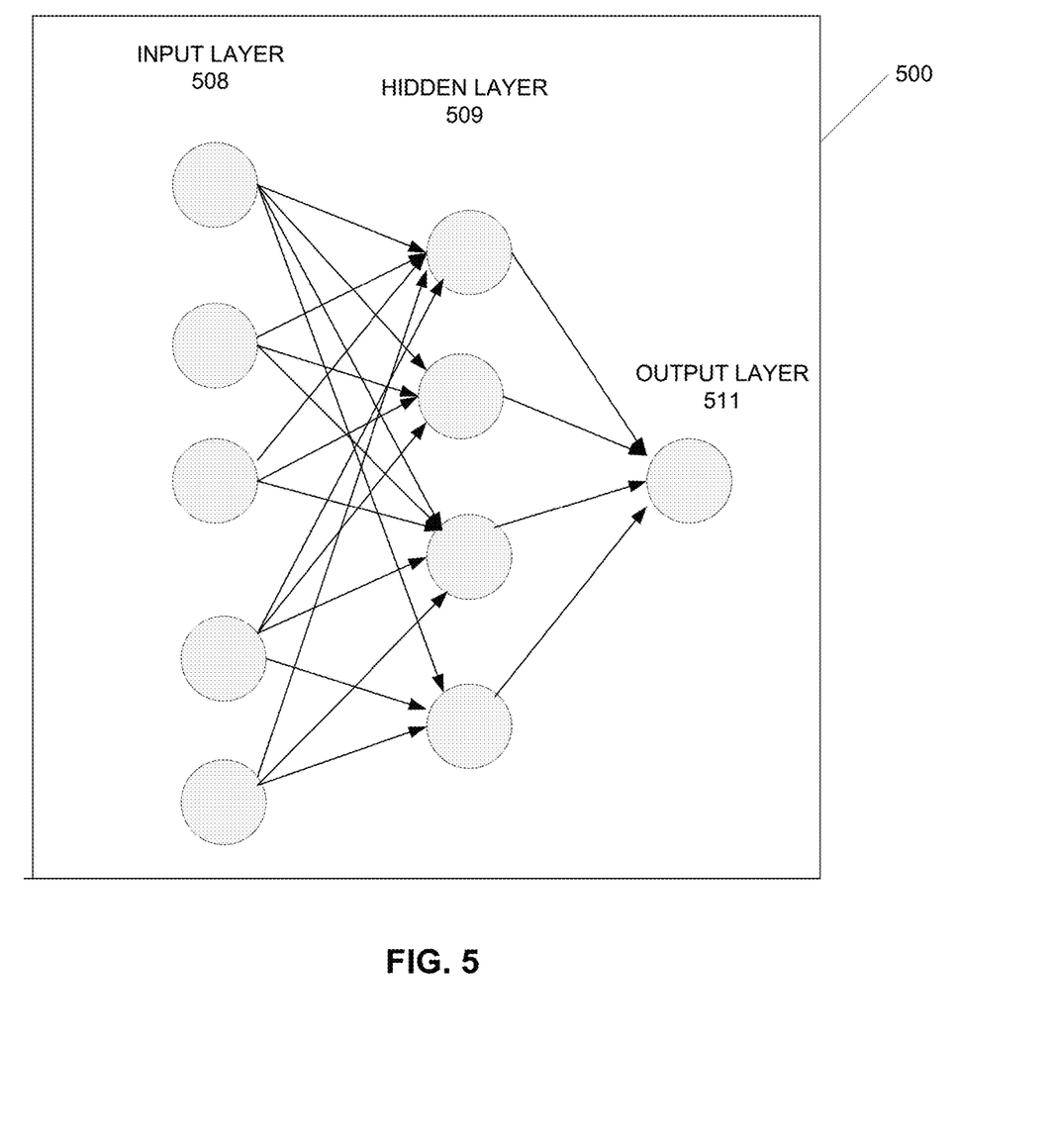
FIG. 5 is an illustrative functional block diagram of a neural network that may be used to implement the processes and functions, in accordance with one or more implementations.

Some aspects of various exemplary constructions are described by referring to and/or using neural network(s). Machine learning module 308 may be configured to electronically process with a machine deep learning controller. Various structural elements of neural network includes layers (input, output, and hidden layers), nodes (or cells) for each, and connections among the nodes. Each node is connected to other nodes and has a nodal value (or a weight) and each connection can also have a weight. The initial nodal values and connections can be random or uniform. A nodal value/weight can be negative, positive, small, large, or zero after a training session with training data set. Computer networks 203, 201 may incorporate various machine intelligence (MI) neutral network 500 (see FIG. 5) features of available TENSORFLOW (https://www.tensorflow.org), KERAS (a component of Tensorflow), or NEUROPH software development platforms (which are incorporated by reference herein). Referring to FIG. 5, neural network 500 is generally arranged in "layers" of node processing units serving as simulated neutrons, such that there is an input layer 508, representing the input fields into the network. To provide the automated machine learning processing, one or more hidden layers 509 with machine learning rule sets processes the input data. An output layer 511 provides the result of the processing of the network data.

The computer readable database 316 may include the "attribute data" including ASCII characters in computer readable form or binary complied data. The ASCII characters or binary data can be manipulated in the software of system 300.

With continued reference to FIG. 3, machine learning module 308 implements deep learning machine learning techniques implementing a representation of learning methods that allows a machine to be given raw data and determine the representations needed for data classification. By using deployment of deep learning software to implement processing, the computing system 300 may eliminate overhead to process the plethora of raw data that can overwhelm the enterprise and/or reduce processing overhead to improve SQL database searches and reduce cost. Deep learning is a subset of machine learning that uses a set of algorithms to model high-level abstractions in data using a deep graph with multiple processing layers including linear and non-linear transformations. While many machine learning systems are seeded with initial features and/or network weights to be modified through learning and updating of the machine learning network, a deep learning network trains itself to identify "good" features for analysis. Using a multilayered architecture, machines employing deep learning techniques can process raw data better than machines using conventional machine learning techniques. Examining data for groups of highly correlated values or distinctive themes is facilitated using different layers of evaluation or abstraction.

Deep learning ascertains structure in data sets using backpropagation algorithms which are used to alter internal parameters (e.g., node weights) of the deep learning machine. Deep learning machines can utilize a variety of multilayer architectures and algorithms. While machine learning, for example, involves an identification of features to be used in training the network, deep learning processes raw data to identify features of interest without the external identification.

In some implementations, machine learning module 308, deep learning in a neural network environment includes numerous interconnected nodes referred to as neurons. Input neurons, activated from an outside source, activate other neurons based on connections to those other neurons which are governed by the machine parameters. A neural network behaves in a certain manner based on its own parameters. Learning refines the machine parameters, and, by extension, the connections between neurons in the network, such that the neural network behaves in a desired manner.

One of implementations machine learning module 308 include deep learning technology that may utilize a convolutional neural network (CNN) segments data using convolutional filters to locate and identify learned, observable features in the data. Each filter or layer of the CNN architecture transforms the input data to increase the selectivity and invariance of the data. This abstraction of the data allows the machine to focus on the features in the data it is attempting to classify and ignore irrelevant background information.

Deep learning operates on the understanding that many datasets include high level features which include low level features. While examining an image, for example, such as computer system diagrams, rather than looking for an object, it is more efficient to look for edges which form motifs which form parts, which form the object being sought. These hierarchies of features can be found in many different forms of data such as speech and text, etc.

In some implementations, learned observable features include objects and quantifiable regularities learned by the machine during supervised learning. A machine provided with a large set of well classified data is better equipped to distinguish and extract the features pertinent to successful classification of new data. A deep learning machine that utilizes transfer learning may properly connect data features to certain classifications affirmed by a human expert. Conversely, the same machine can, when informed of an incorrect classification by a human expert, update the parameters for classification. Settings and/or other configuration information, for example, can be guided by learned use of settings and/or other configuration information, and, as a system is used more (e.g., repeatedly and/or by multiple users), a number of variations and/or other possibilities for settings and/or other configuration information can be reduced for a given example training dataset.

An example deep learning neural network can be trained on a set of expert classified data, for example. This set of data builds the first parameters for the neural network, and this would be the stage of supervised learning. During the stage of supervised learning, the neural network can be tested whether the desired behavior has been achieved.

Once a desired neural network behavior has been achieved (e.g., a machine learning module 308 has been trained to operate according to a specified threshold, etc.), the machine learning module 308 can be deployed for use (e.g., testing the machine with "real" data, etc.). During operation, neural network classifications can be confirmed or denied (e.g., by an expert user, expert system, reference database, etc.) to continue to improve neural network behavior. The example neural network is then in a state of transfer learning, as parameters for classification that determine neural network behavior are updated based on ongoing interactions. In certain examples, the neural network can provide direct feedback to another process. In certain examples, the neural network outputs data that is buffered (e.g., via the cloud, etc.) and validated before it is provided to another process.

In some implementations, machine learning module 308 may be configured to electronically process with the machine learning controller. Machine learning module 308 in conjunction with adaptive optimizer module 320 processes the input through multiple hidden layers to decide whether the SQL syntax can be re-written, or a portion of query's data can be materialized into a sub-table; whether some or all rows scan data can be optimized by clustering the numeric and text representations; ignore scanning unnecessary columns by dimensionality reduction techniques, or applying cosine similarity to identify the words that are closer to each other and grouping records by the pattern for smart scanning technique.

Figure 6:
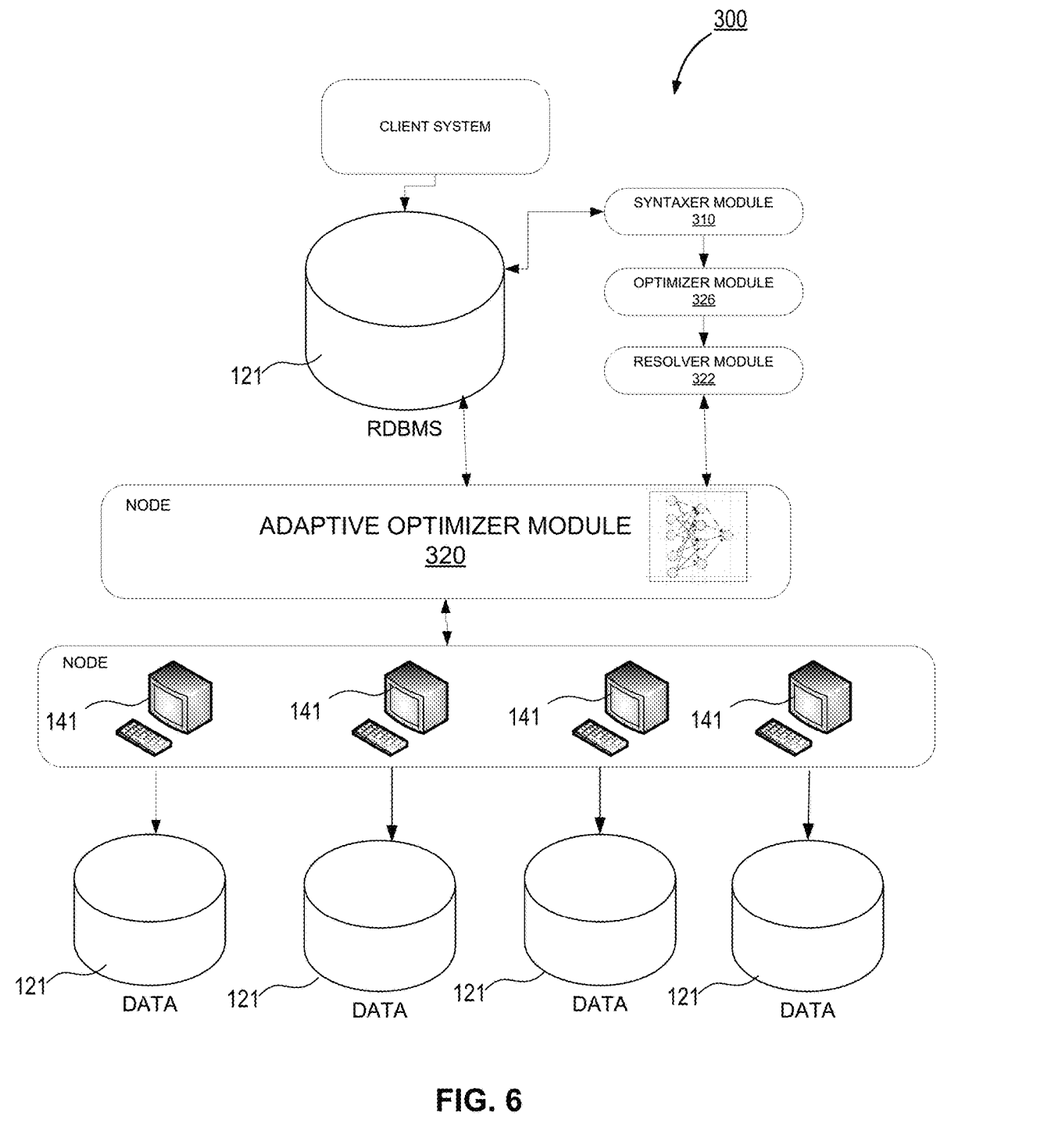
FIG. 6 is an illustrative block diagram of a database computing environment that may be used to implement the processes and functions of certain embodiments.

With reference to FIGS. 4, and 6, in some implementations, syntaxer module 310 parses the SQL language and checks the SQL statements (e.g., query requests) for high-level syntax. A database SQL query refers to a set of statements, commands or clauses that are used to retrieving data stored in the databases. For instance, a query may specify a particular location (e.g., a table, row or column) in a database to retrieve data from, or how to join columns from multiple tables. SQL query statements start with any of the keywords like SELECT, INSERT, UPDATE, DELETE, ALTER, DROP, CREATE, USE, SHOW and the statements end with a semicolon. If no errors are detected in the SQL query statement, the syntaxer module 310 converts the SQL request into a skeletal parse tree referred to as the syntree. A parse tree is a data structure used by the parser module to represent a request parcel in a form that is annotatable with various descriptive and statistical information derived from the data dictionary of RDBMS module 322 and from derived statistics. In some implementations, the module 310 creates a parameterized request component, and then passes the component to the resolver module 312.

With reference to FIGS. 4, and 6, in some implementations, resolver module 312 annotates the syntree with information about such items as data conversions, column names, discretionary access control security checks, and underlying relationships, and then produces a more a secondary parse tree to resolve the objects by looking up system tables. In some implementations, each database or user, table, view, trigger, stored procedure, and macro is assigned a globally unique Object ID number for execution. In some implementations, each column and each index is assigned a numeric ID that is unique within its table.

With reference to FIGS. 4, and 6, in some implementations, adaptive optimizer module 320 employs machine learning module 308 deep learning algorithms by processing the history of the past rules and costs that are stored in the metadata and dictionary tables, and can provide intelligent decision mechanics for SQL syntax re-writing or data processing. In other implementations, adaptive optimizer module 320 electronically processes the data set collected cost profiles, existing optimizer rules and other dictionary metadata containing the syntaxes, objects and columns used in the queries with the machine learning module 308 based on a machine learning training data set 324. Input data factors in the training set data 324 may include various factors, such as resolved object ID attribute data element, number of nodes, number nodes per cluster, number cylinders, block size, read array size. Other factors for the training data set 324 may include cost profile factors such as, retrieve array cost, join array cost, merge processing cost, and sort processing cost. Yet other factors for the training data set 324 may include redistribution array processing, index_scan, full_row_scan, and keys_used parameters.

In some implementations, adaptive optimizer module 320 employs learning module 308 deep learning algorithms to analyze which part of the query syntaxes that can be re-written. In yet other implementations, adaptive optimizer module 320 employs learning module 308 deep learning algorithms to analyze which part of the data that is not needed for query processing by means of clustering analysis and decomposition techniques. In some implementations, adaptive optimizer module 320 employs learning module 308 deep learning algorithms to analyze which part of the text data, where in the unnecessary or low weight words can be removed from the search patterns by using cosine similarity. In some implementations, adaptive optimizer module 320 employs learning module 308 deep learning algorithms to analyze which part of the text data, where in with the feed of text data, topics can be created at run time and classifying the text by topics. This feature will increase the performance of the search by dynamic clustering. In some implementations, adaptive optimizer module 320 employs learning module 308 deep learning algorithms to analyze which part of the numeric data, where range based searches on non-partitioned or non-clustered data can be improved by employing clustering.

In some implementations, RDBMS search module 322 executes the computer readable instructions for the SQL query syntax rewrite and execution of the smart execution plan from adaptive optimizer module 320. In some implementations, optimizer module 326 execute computer readable instructions for determining a baseline execution plan for accessing, joining and aggregating tables using various demographic information about the tables and columns involved in the request and the configuration of the system, as well as numerous heuristic strategies, or rules of thumb.

In some implementations, computing platform(s) 302, remote platform(s) 304, and/or external resources 314 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 314 may be operatively linked via some other communication media.

A given remote platform 304 may include one or more processors configured to execute computer program modules. The computer program modules may be configured to enable an expert or user associated with the given remote platform 304 to interface with system 300 and/or external resources 314, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 314 may include sources of information outside of system 300, external entities participating with system 300, and/or other resources. In some implementations, some or all of the functionality attributed herein to external resources 314 may be provided by resources included in system 300.

Computing platform(s) 302 may include electronic storage 316, one or more processors 318, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 316 may comprise non-transitory storage media that electronically stores information. The electronic storage media of electronic storage 316 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 316 may include a non-transient computer-readable storage medium such as one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 316 may include one or more virtual storage resources (e.g., cloud storage, a virtual private network, and/or other virtual storage resources). Electronic storage 316 may store software algorithms, information determined by processor(s) 318, information received from computing platform(s) 302, information received from remote platform(s) 304, and/or other information that enables computing platform(s) 302 to function as described herein.

Processor(s) 318 may be configured to provide information processing capabilities in computing platform(s) 302. As such, processor(s) 318 may include one or more of a digital processor, an analog processor, a digital circuit designed to process information, an analog circuit designed to process information, a state machine, and/or other mechanisms for electronically processing information. Although processor(s) 318 is shown in FIG. 3 as a single entity, this is for illustrative purposes only. In some implementations, processor(s) 318 may include a plurality of processing units. These processing units may be physically located within the same device, or processor(s) 318 may represent processing functionality of a plurality of devices operating in coordination. Processor(s) 318 may be configured to execute modules 308, 310, and/or 312, and/or other modules. Processor(s) 318 may be configured to execute modules 308, 310, and/or 312, and/or other modules by software; hardware; firmware; some combination of software, hardware, and/or firmware; and/or other mechanisms for configuring processing capabilities on processor(s) 318. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 320, 322 and/or 326 are illustrated in FIG. 3 as being implemented within a single processing unit, in implementations in which processor(s) 318 includes multiple processing units, one or more of modules 308, 310, 312, 320, 322 and/or 326 may be implemented remotely from the other modules. The description of the functionality provided by the different modules 308, 310, 312, 320, 322 and/or 326 described below is for illustrative purposes, and is not intended to be limiting, as any of modules 308, 310, 312, 320, 322, and/or 326 may provide more or less functionality than is described. For example, one or more of modules 308, 310, 312, 320, 322, and/or 326 may be eliminated, and some or all of its functionality may be provided by other ones of modules 308, 310, 312, 320, 322 and/or 326. As another example, processor(s) 318 may be configured to execute one or more additional modules that may perform some or all of the functionality attributed below to one of modules 308, 310, 312, 320, 322 and/or 326.

FIGS. 4A-4D illustrate a method 400 for data processing, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIGS. 4A, 4B, 4C and 4D, and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

Figure 4A:
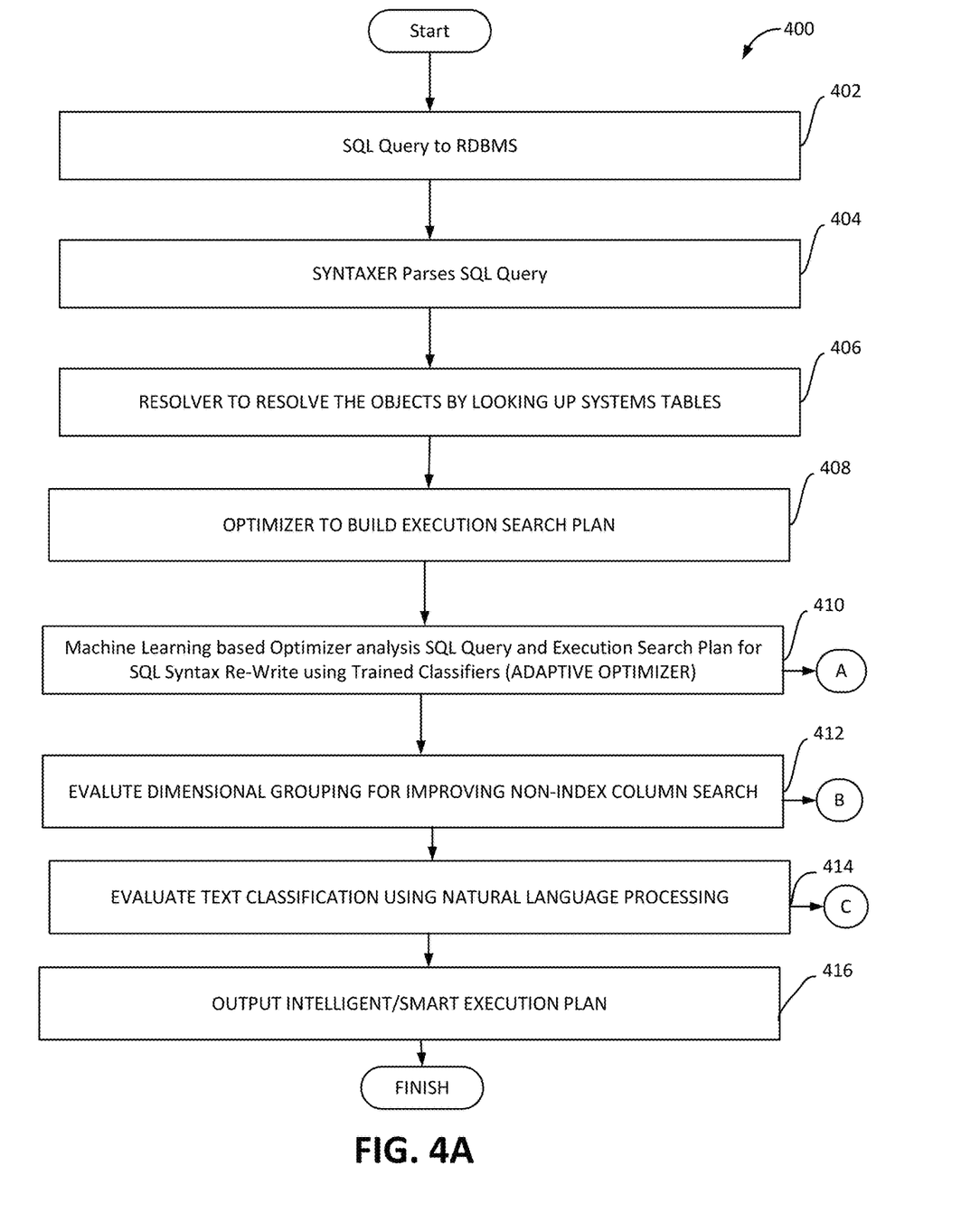
FIGS. 4A-4D illustrate a method for data communication, in accordance with one or more implementations.

FIG. 4A illustrates method 400, in accordance with one or more implementations. An operation 402 may include receiving a SQL query attribute data request in a RDBMS module 322. Operation 402 may be performed by one or more hardware processors configured by machine-readable instructions including module that is the same as or similar to module 322 in accordance with one or more implementations.

An operation 404 may include electronically processing the SQL query to parse the syntax of the SQL statement. Operation 404 may be performed by one or more hardware processors configured by machine-readable instructions including a module that is the same as or similar to syntaxer module 310, in accordance with one or more implementations.

An operation 406 may include electronically processing the parsed SQL query to resolve objects by looking up system tables, in one example. Operation 406 may be performed by one or more hardware processors configured by machine-readable instructions including a module that is the same as or similar to resolver module 312, in accordance with one or more implementations.

An operation 408 may include electronically processing data from the resolver module 312 to build an execution plan responsive to the SQL query. Operation 408 may be performed by one or more hardware processors configured by machine-readable instructions including a module that is the same as or similar to optimizer module 326, in accordance with one or more implementations.

An operation 410 may include electronically processing SQL query to evaluate syntax re-write using the trained classifiers to enhance the execution plan. Operation 410 may be performed by one or more hardware processors configured by machine-readable instructions including a module that is the same as or similar to adaptive optimizer module 320 and machine learning module 308, in accordance with one or more implementations.

An operation 412 may include electronically processing the data to evaluate dimensional grouping for improving non-index column searches. Operation 412 may be performed by one or more hardware processors configured by machine-readable instructions including a module that is the same as or similar to adaptive optimizer module 320 and machine learning module 308, in accordance with one or more implementations.

An operation 414 may include electronically elevating text classification using natural language processing, if the target column includes text data and if it part of a pattern. Operation 414 may be performed by one or more hardware processors configured by machine-readable instructions including a module that is the same as or similar to adaptive optimizer module 320 and machine learning module 308, in accordance with one or more implementations. Operation 414 may include natural language processing with commercially available software, such as SPACY.

An operation 416 may include electronically providing a smart execution plan. In one example, re-written AI generated SQL queries can be sent to the user for execution on RDBMS module 322. In some cases, no re-write is proposed by adaptive optimizer module 320. In such case, a non-optimized execution plan is provided to the user. Operation 416 may be performed by one or more hardware processors configured by machine-readable instructions including a module that is the same as or similar to, adaptive optimizer module 320, RDBMS module 322, and machine learning module 308, in accordance with one or more implementations.

Figure 4B:
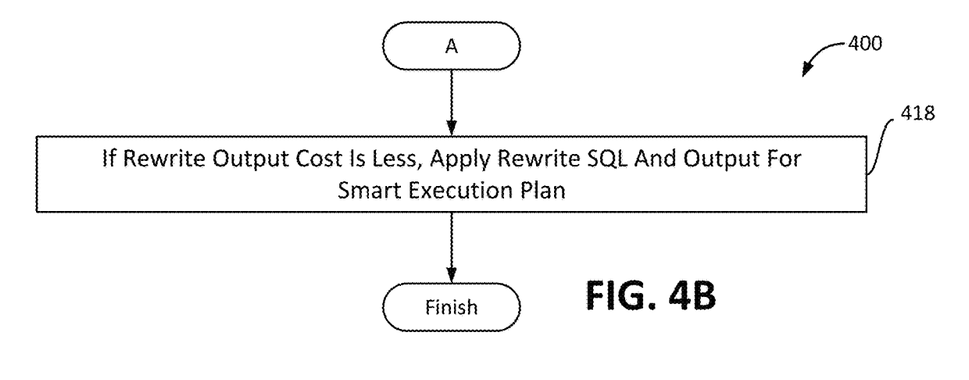

FIG. 4B illustrates method 400, in accordance with one or more implementations. An operation 418 may further include electronically processing, with the machine learning controller and the machine learning based on a training data set 324, if the syntax re-write output projected cost is less than baseline execution plan, then apply the syntax SQL re-write for a smart execution plan. Operation 408 may be performed by one or more hardware processors configured by machine-readable instructions including a module that is the same as or similar to adaptive optimizer module 320 and machine learning module 308, in accordance with one or more implementations.

Figure 4C:
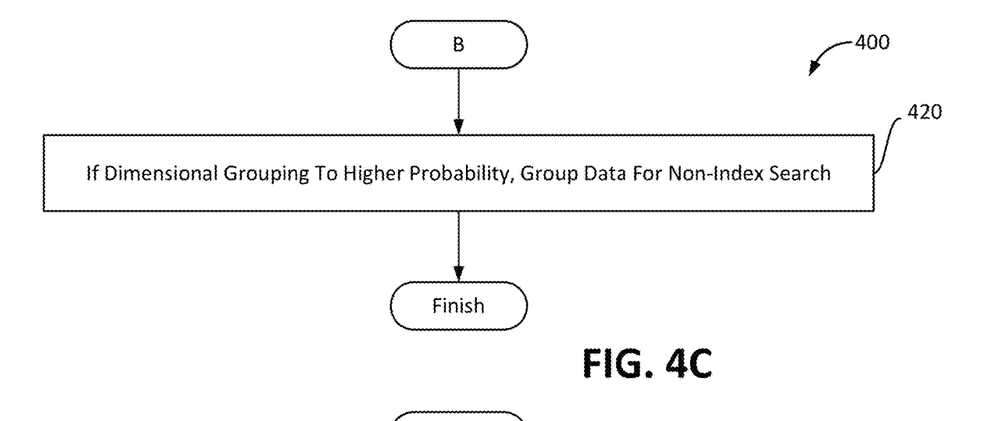

FIG. 4C illustrates method 400, in accordance with one or more implementations. An operation 420 may further include electronically processing, with the machine learning controller, with the machine learning based on a training data set 324, if dimensional grouping evaluates to high probability than baseline execution plan, group data for non-index. Output a smart execution plan which includes the search cluster that contains the highest probability. Operation 420 may be performed by one or more hardware processors configured by machine-readable instructions including a module that is the same as or similar to adaptive optimizer module 320 and machine learning module 308, in accordance with one or more implementations.

Figure 4D:
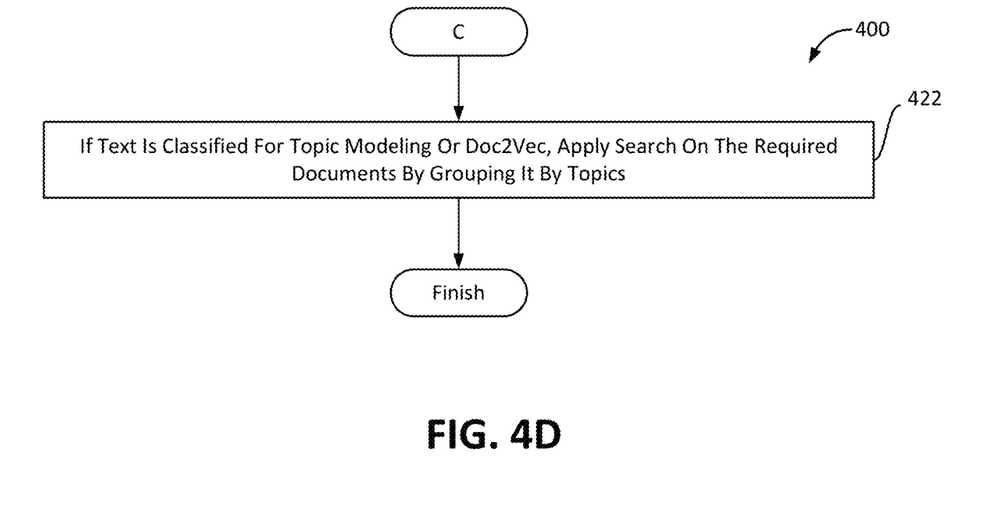

FIG. 4D illustrates method 400, in accordance with one or more implementations. An operation 422 may include further including electronically processing, with the machine learning controller, with the machine learning based on a training data set 324, if the text classified for text modeling or doc2vec format, apply search on the required documents by grouping it by topics. Doc2vec is a natural language processing (NLP) tool for representing documents as a vector and is a generalizing of the word2vec method. Word2vec is a group of related models that are used to produce word embeddings. These models are shallow, two-layer neural networks that are trained to reconstruct linguistic contexts of words. Operation 422 may be performed by one or more hardware processors configured by machine-readable instructions including a module that is the same as or similar to adaptive optimizer module 320 and machine learning module 308, in accordance with one or more implementations.

Figure 7:
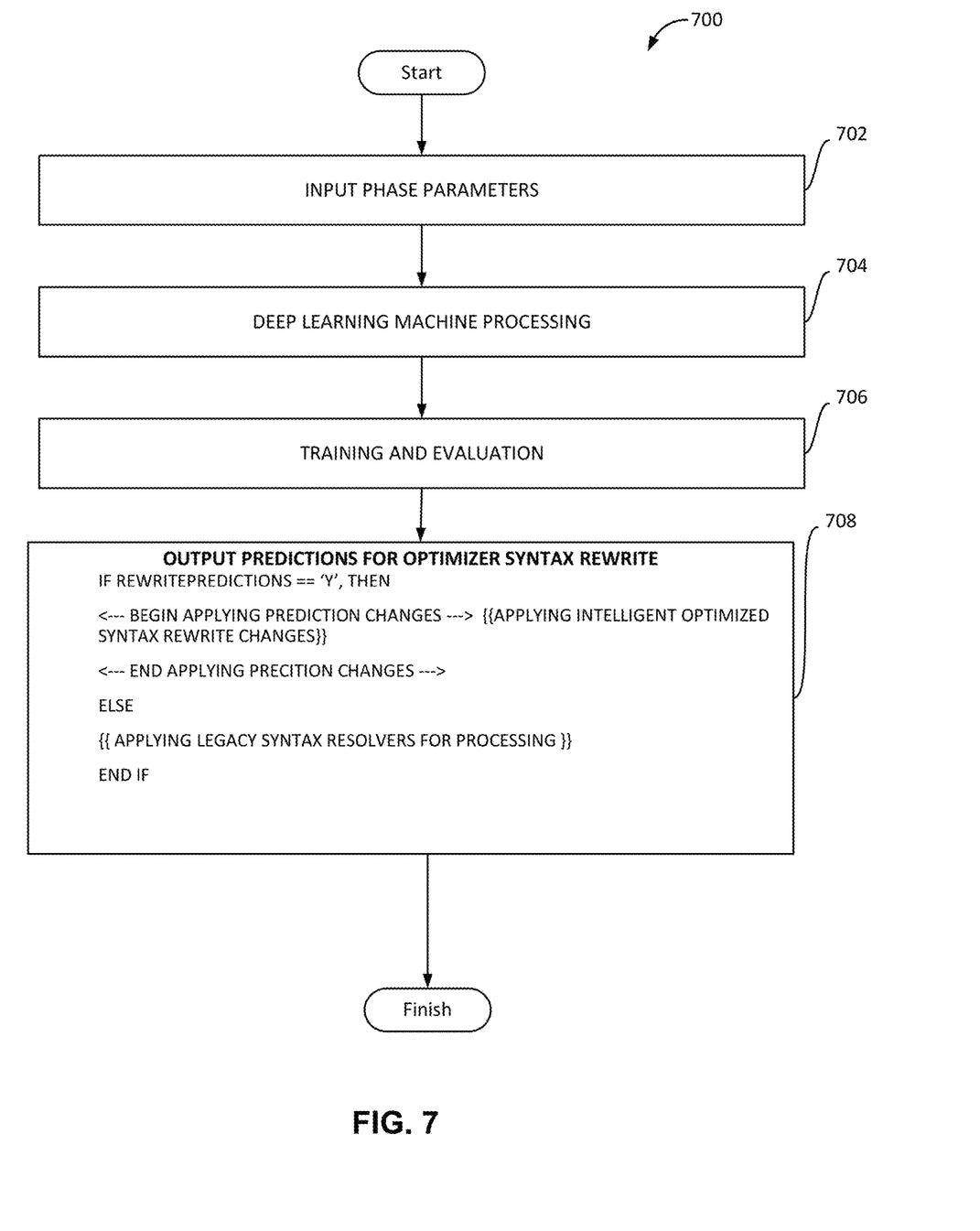
FIG. 7 is an illustrative block diagram of a deep learning machine computing method that may be used to implement the processes and functions of certain embodiments.

FIG. 7 illustrates method 700, in accordance with one or more implementations of a deep learning computing environment that may be used to implement the processes and functions of certain embodiments. An operation 702 may include receiving input phase parameters and training set data 324 as discussed previously. Operation 702 may be performed by one or more hardware processors configured by machine-readable instructions including a module that is the same as or similar to adaptive optimizer module 320 and machine learning module 308, in accordance with one or more implementations.

An operation 704 may further include electronically processing with one or more implementations of a deep learning computing environment employing deep learning software techniques. In some implementations, operation 704 may include applying scaling to the input data from operation 702. In some implementations, operation 704 may include identifying the argument that produces the highest probability score. In some implementations, operation 704 may include applying dimensionality reduction techniques to the data such as principal component analysis. In some implementations, operation 704 may include fitting to the binary entropy classification model with the highest probability feature inputs. In some implementations, operation 704 may include evaluating binary predictions. Operation 704 may be performed by one or more hardware processors configured by machine-readable instructions including a module that is the same as or similar to adaptive optimizer module 320 and machine learning module 308, in accordance with one or more implementations.

An operation 706 may include further including electronically processing with one or more implementations of a deep learning computing environment with deep learning software techniques using training and evaluation modeling. In some implementations, operation 706 may include training the model with deep hidden layers. (See FIG. 5). In some implementations, operation 706 may include applying different entropy parameters to evaluate training scores. In some implementations, operation 706 may include applying reduce mean techniques. Operation 706 may be performed by one or more hardware processors configured by machine-readable instructions including a module that is the same as or similar to adaptive optimizer module 320 and machine learning module 308, in accordance with one or more implementations.

An operation 708 may include further including electronically processing with one or more implementations of a deep learning computing environment to output predictions optimizer syntax re-write instructions. Operation 708 may be performed by one or more hardware processors configured by machine-readable instructions including a module that is the same as or similar to adaptive optimizer module 320 and machine learning module 308, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An electronic computer implemented method of data communication, comprising:
   electronically receiving a query request in computer readable characters for a relational computer readable database having a plurality of computer readable records;
   electronic processing of the query request in SQL and parsing the query request with a syntaxer processor module to generate a parameterized syntree;
   electronically processing the parameterized syntree with a resolver processing module to generate a second parameterized syntree including at least one data conversion data element, a column names data element, and an access control security data element;
   electronically processing the second parameterized syntree with a machine learning convolutional neural network controller including convolutional neural network segments data using convolutional filters without external identification and determining if dimensional grouping evaluates to higher probability than a baseline execution plan, responsive thereto, configure group data for non-index column search, based on a set of machine learning training data so as to output at least one smart execution plan using cosine similarity processing for executing the query request; wherein the at least one smart execution plan includes a search cluster that contains highest probability than the baseline execution plan and the search cluster including said group data for non-index column search; and
   electronic natural language processing of said plurality of computer readable records for text classification to reconstruct linguistic contexts of words for said query request;
   electronically outputting the at least one smart execution plan for executing the query request to a relational database management processing module.

2. The method of claim 1, further comprising dynamic numeric and text clustering of the query request.

3. The method of claim 1, wherein the machine learning controller further comprises deep machine learning machine readable instructions.

4. The method of claim 1, wherein the set of machine learning training data includes at least one cost profile attribute data element.

5. The method of claim 1, wherein the set of machine learning training data includes at least one optimizer rules attribute data element.

6. The method of claim 1, wherein the set of machine learning training data includes at least one resolved object attribute data element.

7. The method of claim 1, further comprising electronically processing a baseline execution plan for the query request.

8. The method of claim 7, further comprising electronically comparing the baseline execution plan to the least one smart execution plan.

9. The method of claim 8, further comprising responsive to the comparing of the baseline execution plan to the least one smart execution plan, if an estimated cost of the least one smart execution plan is less than an estimated cost of the baseline execution plan, electronically re-writing the query request.

10. A system configured for data communication, the system comprising:
   one or more hardware processors configured by machine-readable instructions to:
   electronically receive a query request in computer readable characters for a relational computer readable database having a plurality of computer readable records;
   electronic processing of the query request in SQL and parsing the query request with a syntaxer processor module to generate a parameterized syntree;
   electronically processing the parameterized syntree with a resolver processing module to generate a second parameterized syntree including at least one data conversion data element, a column names data element, and an access control security data element;
   electronically process the second parameterized syntree with a machine learning convolutional neural network controller including convolutional neural network segments data using convolutional filters without external identification and determining if dimensional grouping evaluates to higher probability than a baseline execution plan, responsive thereto, configure group data for non-index column search, based on a set of machine learning training data so as to output at least one smart execution plan using cosine similarity processing for executing the query request; wherein the at least one smart execution plan includes a search cluster that contains highest probability than the baseline execution plan and the search cluster including said group data for non-index column search;
   electronic natural language process said plurality of computer readable records for text classification to reconstruct linguistic contexts of words for said query request; and
   electronically outputting the at least one probable smart execution plan for executing the query request to a relational database management processing module.

11. The system of claim 10, wherein the one or more hardware processors are further configured by machine-readable instructions to dynamic numeric and text clustering of the query request.

12. The system of claim 10, wherein the machine learning controller comprises deep machine learning machine-readable instructions.

13. The system of claim 10, wherein the set of machine learning training data includes at least one cost profile attribute data element.

14. The system of claim 10, wherein the set of machine learning training data includes at least one optimizer rules attribute data element.

15. The system of claim 10, wherein the set of machine learning training data includes at least one resolved object attribute data element.

16. The system of claim 10, wherein the one or more hardware processors are further configured by machine-readable instructions to electronically process a baseline execution plan for the query request.

17. The system of claim 16, wherein the one or more hardware processors are further configured by machine-readable instructions to electronically compare the baseline execution plan to the least one smart execution plan, if an estimated cost of the least one smart execution plan is less than an estimated cost of the baseline execution plan, electronically re-write the query request.

18. A computing platform configured for data communication, the computing platform comprising:
   a non-transitory computer-readable storage medium having executable instructions embodied thereon; and one or more hardware processors configured to execute the instructions to:

electronically receive a query request in computer readable characters for a relational computer readable database having a plurality of computer readable records;

electronic processing of the query request in SQL and parsing the query request with a syntaxer processor module to generate a parameterized syntree;

electronically processing the parameterized syntree with a resolver processing module to generate a second parameterized syntree including at least one data conversion data element, a column names data element, and an access control security data element;

electronically process the second parameterized syntree with a machine deep learning convolutional neural network controller including convolutional neural network segments data using convolutional filters without external identification and determining if dimensional grouping evaluates to higher probability than a baseline execution plan, responsive thereto, configure group data for non-index column search, based on a set of machine learning training data so as to output at least one smart execution plan using cosine similarity processing for executing the query request; wherein the at least one smart execution plan includes a search cluster that contains highest probability than the baseline execution plan and the search cluster including said group data for non-index column search;

electronic natural language process said plurality of computer readable records for text classification to reconstruct linguistic contexts of words for said query request; and electronically outputting the at least one probable smart execution plan for executing the query request to a relational database management processing module.

19. The computing platform of claim 18, wherein the one or more hardware processors are further configured by machine-readable instructions to electronically process a baseline execution plan for the query request.

20. The computing platform of claim 19, wherein the one or more hardware processors are further configured by machine-readable instructions to electronically compare the baseline execution plan to the least one smart execution plan, if an estimated cost of the least one smart execution plan is less than an estimated cost of the baseline execution plan, electronically re-write the query request.

* * * * *